US007721712B2

(12) United States Patent
Bitter et al.

(10) Patent No.: US 7,721,712 B2
(45) Date of Patent: May 25, 2010

(54) PRESSURE REGULATING VALVE

(75) Inventors: Michael Bitter, Bursa (TR); Helmut Sattmann, Eferding (AT); Peter Luckeneder, Walding (AT); Johann Schardax, Linz (AT); Gerold Neuwirt, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 11/722,224

(22) PCT Filed: Nov. 22, 2005

(86) PCT No.: PCT/EP2005/056150

§ 371 (c)(1), (2), (4) Date: Jun. 20, 2007

(87) PCT Pub. No.: WO2006/069860

PCT Pub. Date: Jul. 6, 2006

(65) Prior Publication Data

US 2010/0018501 A1 Jan. 28, 2010

(30) Foreign Application Priority Data

Dec. 23, 2004 (DE) ...................... 10 2004 062 004

(51) Int. Cl.
*F02M 59/36* (2006.01)
*F16K 31/02* (2006.01)

(52) U.S. Cl. ................................ 123/458; 251/129.18

(58) Field of Classification Search ................ 123/458; 251/129.15, 129.18
See application file for complete search history.

(56) References Cited

U.S. PATENT DOCUMENTS

| | | | | |
|---|---|---|---|---|
| 6,131,829 | A * | 10/2000 | Ricco | 239/585.1 |
| 6,155,534 | A * | 12/2000 | Steinruck et al. | 251/129.18 |
| 6,408,824 | B1 | 6/2002 | Pacucci et al. | |
| 7,099,136 | B2 * | 8/2006 | Seale et al. | 361/152 |
| 7,121,264 | B2 * | 10/2006 | Frank et al. | 123/458 |
| 7,216,669 | B2 * | 5/2007 | Braeuer et al. | 137/529 |
| 7,398,795 | B2 * | 7/2008 | Suzuki et al. | 137/487.5 |
| 7,441,546 | B2 * | 10/2008 | Mitsumata et al. | 123/472 |
| 2002/0113219 | A1 | 8/2002 | Rembold et al. | |
| 2003/0057394 | A1 | 3/2003 | Makino | |

FOREIGN PATENT DOCUMENTS

| | | | |
|---|---|---|---|
| EP | 1065372 | A2 | 1/2001 |
| WO | 03083286 | A1 | 10/2003 |

* cited by examiner

*Primary Examiner*—Thomas N Moulis
(74) *Attorney, Agent, or Firm*—Ronald E. Greigg

(57) ABSTRACT

A pressure regulating valve in a fuel injection system for internal combustion engines for regulating the pressure in a fuel reservoir in which the operating pressure is adjusted by the dimensioning of an adjusting disk, whose function-determining axial height is ascertained with high precision by a force measuring system and by a travel measuring system by way of ascertaining a spacing between an end face of a valve member of the pressure regulating valve and a reference face of a housing of the pressure regulating valve.

18 Claims, 2 Drawing Sheets

PRESSURE REGULATING VALVE

CROSS-REFERENCE TO RELATED APPLICATION

This application is a 35 USC 371 application of PCT/EP 2005/056150 filed on Nov. 22, 2005.

BACKGROUND OF THE INVENTION

1. Field of the Invention

The invention relates to a pressure regulating valve, having an electromagnet and a movable armature, that is used in particular in a fuel injection system for internal combustion engines for regulating a pressure in a fuel reservoir.

Electromagnets with a movable armature are also used as actuators in manifold applications.

2. Prior Art

Manifold versions of pressure regulating valves are known. The pressure regulating valve serves to regulate the pressure in a fuel reservoir, with which it communicates via an inlet. The pressure regulating valve has a pistonlike valve member, which is guided axially displaceably in a bore and which can move counter to a force that acts on the valve member, preferably by means of the current in the electromagnet. The force acts in the closing direction, so that the valve member is pressed onto a closing element of the pressure regulating valve and is pressed against a valve seat. The valve member forms an armature bolt of an electromagnet, which can be supplied with current to control the force.

By means of the current supply, a magnetic field is created, which penetrates the armature of the electromagnet and causes a magnetic force to act on the armature bolt. With this force, the valve member presses the closing element against the valve seat.

If the force generated by the hydraulic pressure of the fuel exceeds the closing force that is exerted on the closing element via the valve member, then the closing element is lifted from the valve seat. In this case, fuel flows out of the fuel reservoir through the inlet via the opened pressure regulating valve into a relief chamber.

When a higher pressure is set in the fuel reservoir, the current in the electromagnet is increased, so that the closing force is increased, and thus the closing element does not lift from the valve seat until at a higher pressure in the fuel reservoir, and then fuel can flow out of the fuel reservoir into the relief chamber.

3. Disadvantages Of The Prior Art

Regulating the pressure in the fuel reservoir is done via the setting of the current in the coil of the electromagnet. The actual pressure thus depends on the parameters of the electromagnet. These include not only the electromagnetic parameters but also the geometrical dimensions. The air gap between the movable armature and the fixed valve housing, within which gap the coil of the electromagnet is located, is of particular importance. The air gap is defined by the component geometry.

To enable adjusting the pressure precisely or regulating a precise pressure interval, the components must be adapted to one another precisely. The requisite manufacturing tolerances are correspondingly low, which means major assembly effort and hence expense.

OBJECT OF THE INVENTION

The object of the invention is to refine the pressure regulating valve known from prior art, in such a way that adjusting the closing force of the valve can be done in a precise way, in the preassembled state.

The object is attained in a regulating valve according to the invention in which the spacing between the armature and the valve housing is definitive for the penetration of the armature by the magnetic field lines and accordingly for the magnetic force that can be transmitted by the armature and leads to the closing force of the pressure regulating valve. Detecting this spacing is done according to the invention by measuring a force generated by the magnetic circuit and from a travel measurement in a simultaneously occurring position of the valve member. These two physical variables can be detected very precisely and make a precise adjustment of the pressure regulating valve possible without mechanical tolerances and the material properties of the electromagnet having any influence.

In an advantageous embodiment, the current supply to the electromagnet is effected with a current that corresponds to the rated operating point of the pressure regulating valve, so that in this case conditions of the kind that occur later in operation of the pressure regulating valve as well are also present.

It is also advantageous that the current supply to the electromagnet is done in a regulated way, so that feedback effects on the measurements, especially upon positioning of the valve member, are avoided, and the current corresponding to the rated operating point of the pressure regulating valve prevails constantly.

BRIEF DESCRIPTION OF THE DRAWINGS

One exemplary embodiment of the invention is described in further detail herein below, with reference to the drawings, in which.

DESCRIPTION OF THE PREFERRED EMBODIMENT

Figure 1:
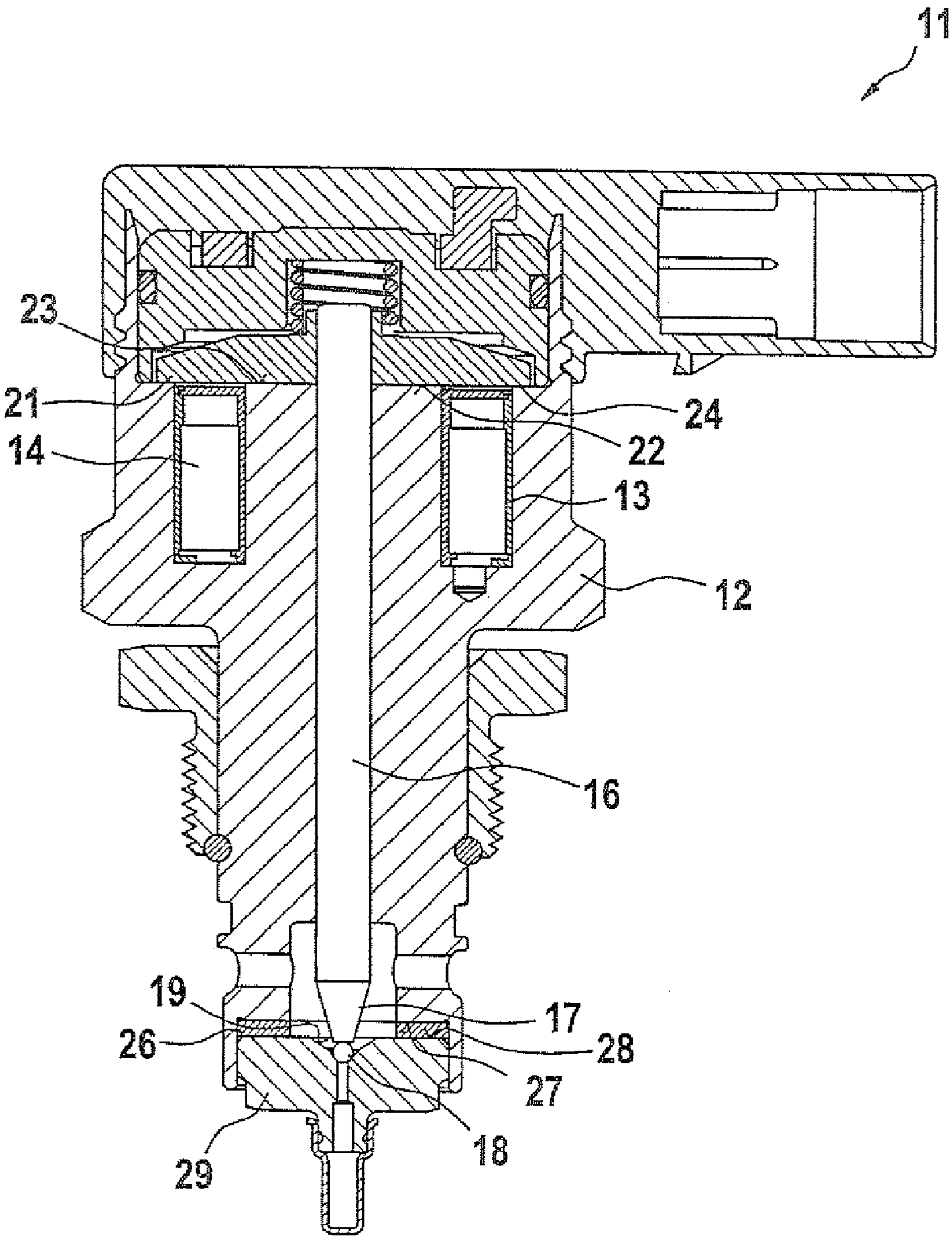
FIG. 1 shows a schematic view of a pressure regulating valve in longitudinal section, to illustrate the mode of operation of the pressure regulating valve, and In FIG. 2, also in longitudinal section, the pressure regulating valve is shown with only those parts that are of importance for the cooperation with schematically shown measurement systems for detecting a force and a travel.

In FIG. 1, a longitudinal section is shown through a schematic view of a pressure regulating valve 11 which can be disposed on a fuel reservoir, not shown in this drawing.

The pressure regulating valve 11 has a housing 12, in which an electromagnet 13 with a coil winding 14 is located. The coil winding 14 is embedded in soft-magnetic material.

An armature bolt 16 of the electromagnet 13 is located in an axial recess in the housing 12 and on its free end, as a valve member 17, presses against a closing element 18; the closing element 18 in turn is braced on a valve seat 19.

A radially extending armature plate 21 is mounted on the other end of the axially oriented armature bolt 16; with a plane underside 22, the armature bolt is spaced apart from a diametrically opposed plane top side 23 of the housing 12 through an air gap 24, which because of its slight dimensions does not stand out in the drawing. In the pressure regulating valve 11, the air gap 24 is adjusted by the axial height of an adjusting disk or shim 26, which is disposed between a reference face 27 of the housing 12 and a diametrically opposed contact face 28 of a valve seat body 29.

Supplying current to the electromagnet 13 causes the armature plate 21 and the armature bolt 16 to be penetrated by magnetic flux lines, as a result of which a magnetic force is operative which presses the valve member 17 against both the closing element 18 and the valve seat 19. The magnitude of this force is dependent on the size of the air gap 24.

Figure 2:
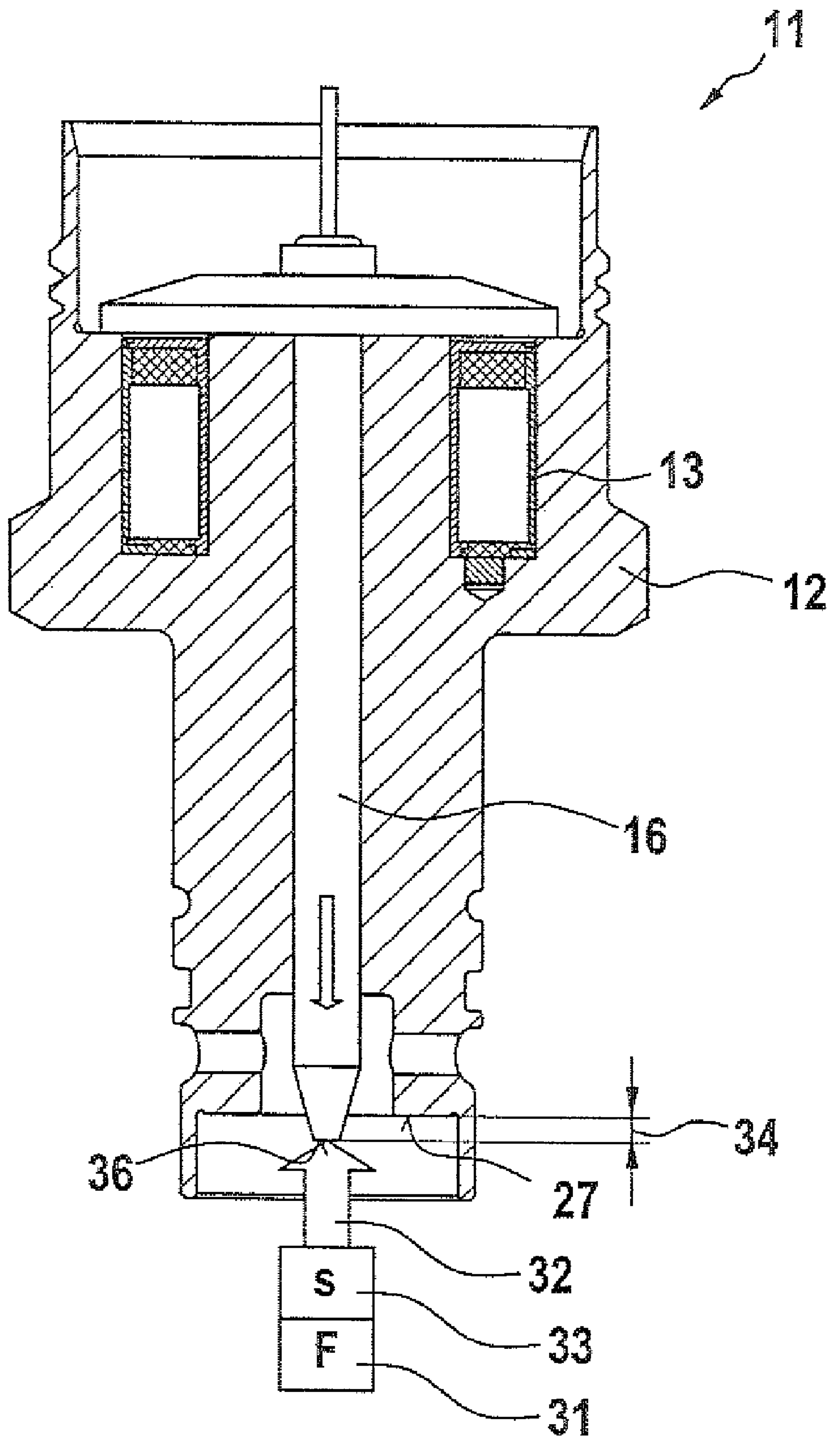

The pressure regulating valve 11 shown in longitudinal section in FIG. 2, the parts of which taken over from FIG. 1 will not be named here again, is provided with a force measuring system 31, coupled to the armature bolt 16, and with a travel measuring system 33 having a positioning pin 32, shown only schematically, and with which pin a spacing 34 between the reference face 27 and an end face 36 of the valve member 17 is ascertained.

For ascertaining the spacing 34 for the dimensioning of the axial height of the adjusting disk 26 that is still to be inserted and that is shown in FIG. 1, the electromagnet 13 is subjected to a current which corresponds to the rated operating point of the pressure regulating valve 11. From this basic situation, the armature bolt 16, in the housing 12 that is fixed in stationary fashion, is displaced counter to the force brought about by supplying current to the electromagnet 13, until a predetermined contrary force, with which the pressure regulating valve 11 is to close at the rated operating point, is reached. This force is controllable by the force measuring system 31 with high precision.

The aforementioned displacement of the armature bolt 16 is effected by the positioning pin 32 of the travel measuring system 33, which pin rests on the end face 36 of the valve member 17.

Once the predetermined contrary force, controlled by the force measuring system 31, is reached, the axial spacing 34 between the end face 36 of the valve member 17 and the reference face 27 of the housing 12 of the pressure regulating valve 11 is measured, at the rated operating point of the pressure regulating valve 11, with high precision by the travel measuring system 33.

Because of the precision measurements of the travel measuring system 33 and of the force measuring system 31 that controls the travel measuring system, the preconditions for high-precision ascertainment of the spacing 34 and of the axial height, which can be derived with it, of the adjusting disk 26 exist, so that thus the pressure of the fuel reservoir which is monitored by the pressure regulating valve 11 can be adhered to within narrow limits.

The foregoing relates to a preferred exemplary embodiment of the invention, it being understood that other variants and embodiments thereof are possible within the spirit and scope of the invention, the latter being defined by the appended claims.

The invention claimed is:

1. A pressure regulating valve for a fuel injection system for internal combustion engines for regulating the pressure in a fuel reservoir, the regulating valve having a valve member which is axially displaceably guided in a recess of a housing of the pressure regulating valve and which acts on a closing element that can be pressed against a valve seat, the valve member forming part of an armature bolt of an electromagnet that can be supplied with current, the improvement comprising a spacing between the valve member and a reference face of the housing at a predetermined current supply to the electromagnet, and a simultaneous position of the valve member is ascertained up to a predetermined contrary force.

2. The pressure regulating valve as defined by claim 1, wherein the predetermined current supply to the electromagnet is effected at a current that corresponds to the rated operating point of the pressure regulating valve.

3. The pressure regulating valve as defined by claim 2, wherein the current supply is effected in a regulated fashion.

4. The pressure regulating valve as defined by claim 1, wherein the positioning of the valve member is detected by a travel measuring system, and the contrary force to be adhered to in the process is detected by a force measuring system.

5. The pressure regulating valve as defined by claim 2, wherein the positioning of the valve member is detected by a travel measuring system, and the contrary force to be adhered to in the process is detected by a force measuring system.

6. The pressure regulating valve as defined by claim 3, wherein the positioning of the valve member is detected by a travel measuring system, and the contrary force to be adhered to in the process is detected by a force measuring system.

7. The pressure regulating valve as defined by claim 1, wherein the spacing between the valve member and the reference face is ascertained by the travel measuring system for dimensioning an adjusting disk for the pressure regulating valve, by way of which adjusting disk an air gap that determines the adjusting force of the pressure regulating valve is adjusted.

8. The pressure regulating valve as defined by claim 2, wherein the spacing between the valve member and the reference face is ascertained by the travel measuring system for dimensioning an adjusting disk for the pressure regulating valve, by way of which adjusting disk an air gap that determines the adjusting force of the pressure regulating valve is adjusted.

9. The pressure regulating valve as defined by claim 3, wherein the spacing between the valve member and the reference face is ascertained by the travel measuring system for dimensioning an adjusting disk for the pressure regulating valve, by way of which adjusting disk an air gap that determines the adjusting force of the pressure regulating valve is adjusted.

10. The pressure regulating valve as defined by claim 4, wherein the spacing between the valve member and the reference face is ascertained by the travel measuring system for dimensioning an adjusting disk for the pressure regulating valve, by way of which adjusting disk an air gap that determines the adjusting force of the pressure regulating valve is adjusted.

11. The pressure regulating valve as defined by claim 5, wherein the spacing between the valve member and the reference face is ascertained by the travel measuring system for dimensioning an adjusting disk for the pressure regulating valve, by way of which adjusting disk an air gap that determines the adjusting force of the pressure regulating valve is adjusted.

12. The pressure regulating valve as defined by claim 6, wherein the spacing between the valve member and the reference face is ascertained by the travel measuring system for dimensioning an adjusting disk for the pressure regulating valve, by way of which adjusting disk an air gap that determines the adjusting force of the pressure regulating valve is adjusted.

13. A pressure regulating valve comprising an adjusting disc dimensioned in accordance with claim 7.

14. A method for precisely adjusting the closing force exerted on a closing element of a valve used for regulating pressure in a fuel reservoir of a fuel injection system for internal combustion engines, said valve having a valve member, which is axially displaceably guided in a recess of a housing of the valve and which acts on the closing element that can be pressed against a valve seat, the valve member forming part of an armature bolt of an electromagnet that can be supplied with current, said method comprising the steps of:

supplying the electromagnet with a current sufficient to generate a desired force acting on the valve member in the closing direction of the valve;

measuring the force acting on the valve member in the closing direction of the valve; and measuring the distance between a reference face located on the housing of the valve and an end face of the valve member.

15. The method of claim 14, wherein the supply of current to the electromagnetic is regulated so that the measured force acting on the valve member in the closing direction of the valve is equal to a desired force necessary to lift the closing element away from the valve seat.

16. The method of claim 15, wherein the distance between the reference face located on the housing of the valve and the end face of the valve member is measured when the measured force acting on the valve member in the closing direction of the valve is equal to the desired force necessary to lift the closing element away from the valve seat.

17. The method of claim 16, further comprising the step of: dimensioning the axial height of an adjusting disk for the pressure regulating valve such that the axial height of the adjusting disk is equal to the measured distance between the reference face located on the housing of the valve and the end face of the valve member when the measured force acting on the valve member in the closing direction of the valve is equal to the desired force necessary to lift the closing element away from the valve seat.

18. A pressure regulating valve having an adjusting disk made by the method of claim 17.

* * * * *